(12) United States Patent
Mohen et al.

(10) Patent No.: US 12,014,349 B2
(45) Date of Patent: Jun. 18, 2024

(54) TRANSMITTING AND RECEIVING EMBEDDED DIGITAL TOKENS WITHIN A BLOCKCHAIN ENVIRONMENT

(71) Applicant: Web3 IP Holdings LLC, Greenwich, CT (US)

(72) Inventors: Jim M. Mohen, Stamford, CT (US); John W. Masotti, Stamford, CT (US); Leon Afanasyev, Stamford, CT (US); Timur Nutfullin, Kazam (RU)

(73) Assignee: Web3 IP Holdings LLC, Greenwich, CT (US)

(*) Notice: Subject to any disclaimer, the term of this patent is extended or adjusted under 35 U.S.C. 154(b) by 0 days.

(21) Appl. No.: 18/155,479

(22) Filed: Jan. 17, 2023

(65) Prior Publication Data

US 2023/0177485 A1 Jun. 8, 2023

Related U.S. Application Data

(62) Division of application No. 17/247,597, filed on Dec. 17, 2020, now Pat. No. 11,580,520.

(60) Provisional application No. 62/949,190, filed on Dec. 17, 2019.

(51) Int. Cl.
*G06Q 20/32* (2012.01)
*G06Q 20/36* (2012.01)
*G06Q 30/0207* (2023.01)
*G10L 19/00* (2013.01)

(52) U.S. Cl.
CPC ......... *G06Q 20/326* (2020.05); *G06Q 20/367* (2013.01); *G06Q 30/0207* (2013.01); *G10L 19/00* (2013.01)

(58) Field of Classification Search
CPC .............. G06Q 20/326; G06Q 20/367; G06Q 30/0207; G06Q 20/02; G06Q 20/065; G06Q 20/123; G06Q 2220/00; G10L 19/00; H04L 9/50
See application file for complete search history.

(56) References Cited

U.S. PATENT DOCUMENTS

| | | | |
|---|---|---|---|
| 11,710,373 B2* | 7/2023 | Meltzer | G07F 17/3241 705/66 |
| 2002/0049967 A1* | 4/2002 | Haseltine | G06Q 30/0241 705/14.4 |
| 2019/0220836 A1* | 7/2019 | Caldwell | G06Q 20/38215 |
| 2019/0305938 A1* | 10/2019 | Sandberg-Maitland | H04L 9/0897 |

(Continued)

*Primary Examiner* — Alexandru Cirnu
(74) *Attorney, Agent, or Firm* — Squire Patent Consulting & IP Law LLC; Brendan E. Squire

(57) ABSTRACT

A system, method, apparatus, and computer program product for interactively broadcasting value via a sound, a Wi-Fi, a Bluetooth, an email, a messaging, an RFID, or an NFC to incentivize direct consumer engagement. The system produces verifiable data on customer preferences, habits, and purchasing while using secure digital cryptographic technology to convey an item of value. The system is configured to transact a digital token normally carried on a blockchain leger in an off-ledger condition. The digital token is embedded with a media content. A mobile computing device having a representation of a digital wallet is configured to detect the digital token, decode the digital token and transfer the digital token back to the blockchain ledger. When validated by the blockchain ledger, the digital token is transacted to a digital wallet on the blockchain ledger.

9 Claims, 11 Drawing Sheets

(56) References Cited

U.S. PATENT DOCUMENTS

| 2020/0012765 A1* | 1/2020 | Smaiely | G06Q 20/1235 |
| 2020/0074461 A1* | 3/2020 | Derosa-Grund | H04N 21/2543 |
| 2021/0056630 A1* | 2/2021 | Rechtschaffen | G06Q 20/0655 |

* cited by examiner

Content Provider 1 (CP1) Wallet 53-1

| Coins | Amount | USD Equiv. |
|---|---|---|
| ATM Coins | 12 | $12.00 |
| CP1 | 11 | $13.75 |
| USD | $15.45 | $15.45 |
| Euro | 3 | $3.45 |

[Collect] [Redeem] [Media]

Content Provider 2 (CP2) Wallet 53-2

| Coins | Amount | USD Equiv. |
|---|---|---|
| ATM Coins | 12 | $12.00 |
| CP2 | 3 | $3.00 |
| USD | $8.43 | $8.43 |
| Euro | 2 | $2.30 |

[Collect] [Redeem] [Media]

Content Provider 3 (CP3) Wallet 53-3

| Coins | Amount | USD Equiv. |
|---|---|---|
| ATM Coins | 12 | $12.00 |
| CP3 | 8 | $6.00 |
| USD | $3.50 | $3.50 |
| Euro | 1.5 | $1.73 |

[Collect] [Redeem] [Media]

Content Provider n (CPn) Wallet 53-n

| Coins | Amount | USD Equiv. |
|---|---|---|
| ATM Coins | 12 | $12.00 |
| CPn | 24 | $26.40 |
| USD | $7.50 | $7.50 |
| Euro | 3 | $3.45 |

[Collect] [Redeem] [Media]

Aggregated Wallet 53

| Coins | Amount | USD Equiv. |
|---|---|---|
| ATM Coins | 12 | $12.00 |
| CP1 | 11 | $13.75 |
| CP2 | 3 | $3.00 |
| CP3 | 8 | $6.00 |
| CPn | 24 | $26.40 |
| USD | $15.45 | $8.43 |
| Euro | 2 | $2.30 |
| Balance | | $71.88 |

[Collect] [Redeem] [Media]

FIG. 2

Content Provider Coin Data

General Information

| Gender | Age | Race | Income | # of Wallets | % of Wallets | Education | | |
|---|---|---|---|---|---|---|---|---|
| | | | | | | HS | College | Graduate |
| Male | 16 - 24 | Asian | 0 - 85 | 24,571 | 100% | 40% | 50% | 10% |

User Engagement

| Surveys Participation | Trailers / Pre-views Watched | Coins Available | Coins Earned | Coins Redeemed | Peak Engagement Hours | Peak Engagement Content |
|---|---|---|---|---|---|---|
| 25% | 30% | 34,707 | 10,412 | 7,288 | 7 - 8pm est | Gaming |

Cross Platform Metrics

| Incoming Redemptions (Non-Discovery rewards spent on Discovery Content) | Outgoing Redemptions (Discovery rewards spent on Non Discovery Content) | Net Platform Redemptions | Highest Redemption Incoming | Highest Redemption Outgoing |
|---|---|---|---|---|
| 132,100 | 95,600 | 36,500 | Golf TV | Disney |

FIG. 3

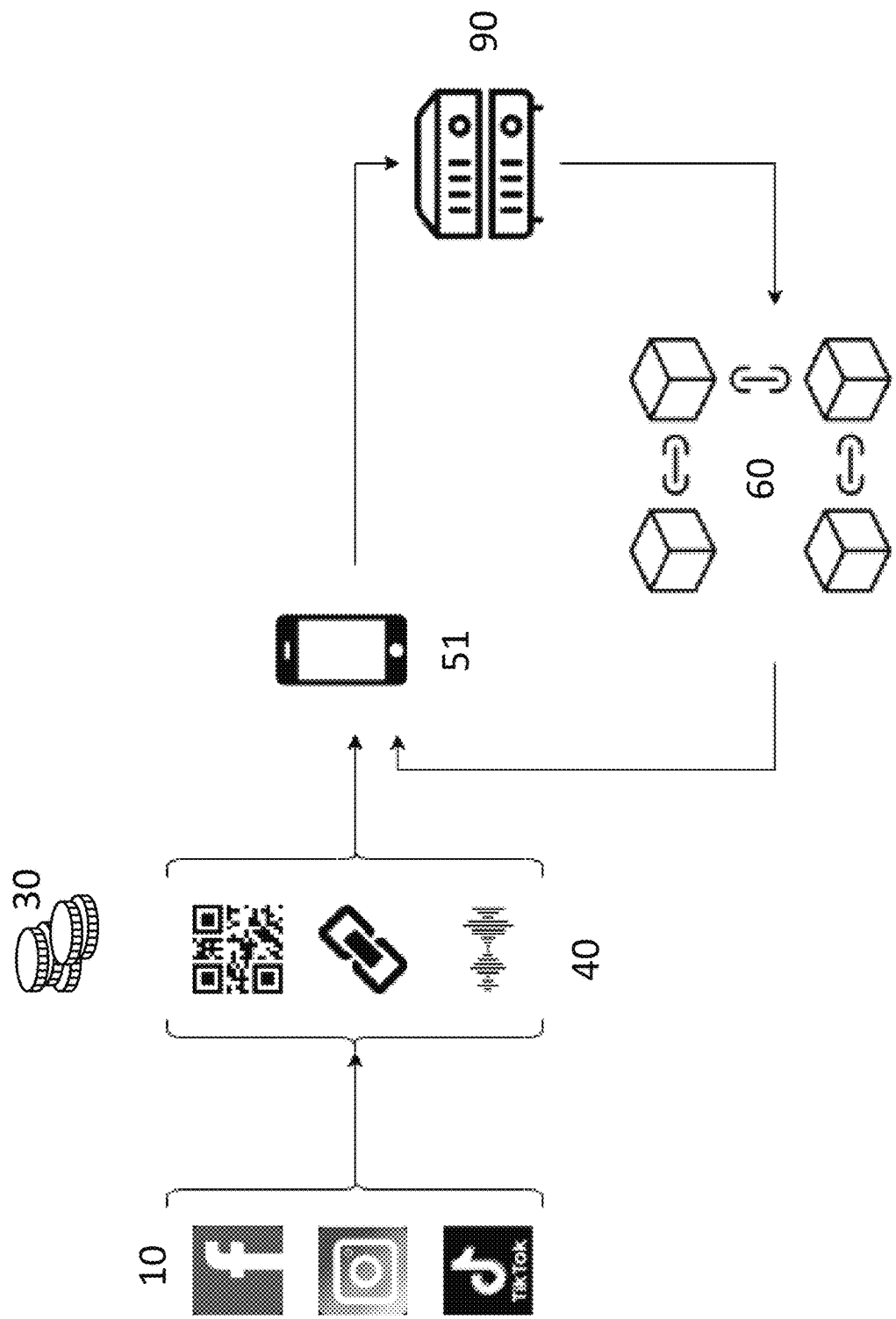

TRANSMITTING AND RECEIVING EMBEDDED DIGITAL TOKENS WITHIN A BLOCKCHAIN ENVIRONMENT

CROSS-REFERENCE TO RELATED APPLICATION

This application is a divisional application of U.S. patent application Ser. No. 17/247,597, filed Dec. 17, 2020, and claims the benefit of priority of U.S. provisional application No. 62/949,190 filed Dec. 17, 2019, the contents of which are herein incorporated by reference.

BACKGROUND OF THE INVENTION

The present invention relates to value transactions, and more particularly, exchanging value between a sender and receiver via an acoustic signal or other wireless means.

Content creators, distributors, advertisers and other entities cannot transfer value via sound and other means to directly interact with consumers in a secure, cost efficient and immutable manner while collecting secure verifiable data. Delivery of incentives cannot be made via secure sound and other means, and existing incentive programs are inefficient and expensive to administer. In addition, the experience for consumers is cumbersome with relatively low participation and redemption rates, while customer data is very limited and sometimes non-existent for the advertiser or rewards sponsor.

As can be seen, there is a need for improved systems, apparatus, and business methods to secure the transfer of value to the consumer in the form of a digital currency or other valuable, and exchanges consumer personal data, through an immutable, append only blockchain based solution. The broadcast function also allows safe and secure direct interactions in previously inaccessible environments. For example, shooting t-shirts represented by digital tokens over a stadium screen or directly to a consumer's mobile device while watching at home on TV using a QR code for redemption.

SUMMARY OF THE INVENTION

In one aspect of the present invention, a system for to interactively broadcast value is disclosed. The system includes a blockchain ledger accessible via a communications network. The blockchain ledger is configured to settle a transaction of a digital token carried on the blockchain ledger. A media content has an encrypted audio encoding of the digital token embedded therein. When encrypted, the digital token is in an off blockchain condition. A transmission medium for playing the media content. A receiver coupled to a mobile computing device. The receiver is configured to receive the media content. A digital wallet representation on the mobile computing device is configured to extract the encrypted audio encoding of the digital token from the media content and store a decrypted digital token.

In some embodiments, a digital wallet is carried on the blockchain ledger. The digital wallet corresponds to the digital wallet representation on the mobile computing device. When connected with the communications network, the digital wallet representation is configured to send the decrypted digital token to the digital wallet on the blockchain ledger.

In some embodiments, the blockchain ledger is configured to validate the decrypted digital token with the digital token. Once validated, the decrypted digital token is returned to an on blockchain condition as the digital token.

In other aspects of the invention, a method of transacting a digital token on a blockchain ledger is disclosed. The method includes encoding a digital token carried on a blockchain ledger as an encoded digital token. The encoded digital token is then embedded the in a media content. The encoded digital token is transmitting in an off-ledger condition during a playback of the media content. The media content containing the encoded digital token is received by a representation of a digital wallet operating on a mobile computing device.

In some embodiments, the method includes decoding the encoded digital token by the representation of the digital wallet as a decoded digital token.

The decoded digital token is submitted to the blockchain ledger via a communication network.

When received, the decoded digital token is validated against the digital token on the blockchain ledger. When validated, the digital token is reflected in a digital wallet on the blockchain ledger. The digital wallet corresponds to the representation of the digital wallet on the mobile computing device.

In some embodiments, the method includes embedding a survey in the media content. The media content is received by the representation of a digital wallet and the decoded digital token is to the blockchain ledger upon completion of the survey In some embodiments, the method includes submitting information from the mobile computing device in exchange for the digital token.

The method may also include targeting the media content to a targeted demographic group.

In other aspects of the invention, a non-transitory computer-readable media adapted for use by a content distribution service provider to distribute a digital token is disclosed. The computer-readable media is used to direct a computer of the content distribution service provider to perform process steps. The steps include encoding a digital token carried on a blockchain ledger as an encoded digital token. The steps also include embedding the encoded digital token in a media content. The encoded digital token is transmitted in an off-ledger condition during a playback of the media content. The media content containing the encoded digital token is received by a representation of a digital wallet operating on a mobile computing device.

In some embodiments, the steps include decoding the encoded digital token by the representation of the digital wallet as a decoded digital token. The decoded digital token is submitted to the blockchain ledger via a communication network.

The steps also include, validating the decoded digital token against the digital token on the blockchain ledger and, when validated, reflecting the digital token in a digital wallet on the blockchain ledger. The digital wallet corresponds to the representation of the digital wallet on the mobile computing device.

These and other features, aspects and advantages of the present invention will become better understood with reference to the following drawings, description and claims.

BRIEF DESCRIPTION OF THE DRAWINGS

FIG. 2 is a block diagram illustrating an aggregator within a rewards ecosystem.

FIG. 3 is a diagram illustrating verifiability of data acquired within the rewards ecosystem.

FIG. 9 illustrates a transaction of a digital token via a social media network.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a system, method, apparatus, and computer program product that allows for secure transfer of value to a consumer in the form of a digital token other valuable, and exchanges consumer personal data, through an immutable blockchain based solution. An audio broadcast function also allows safe and secure direct interactions of the digital tokens in previously inaccessible environments.

Figure 1:
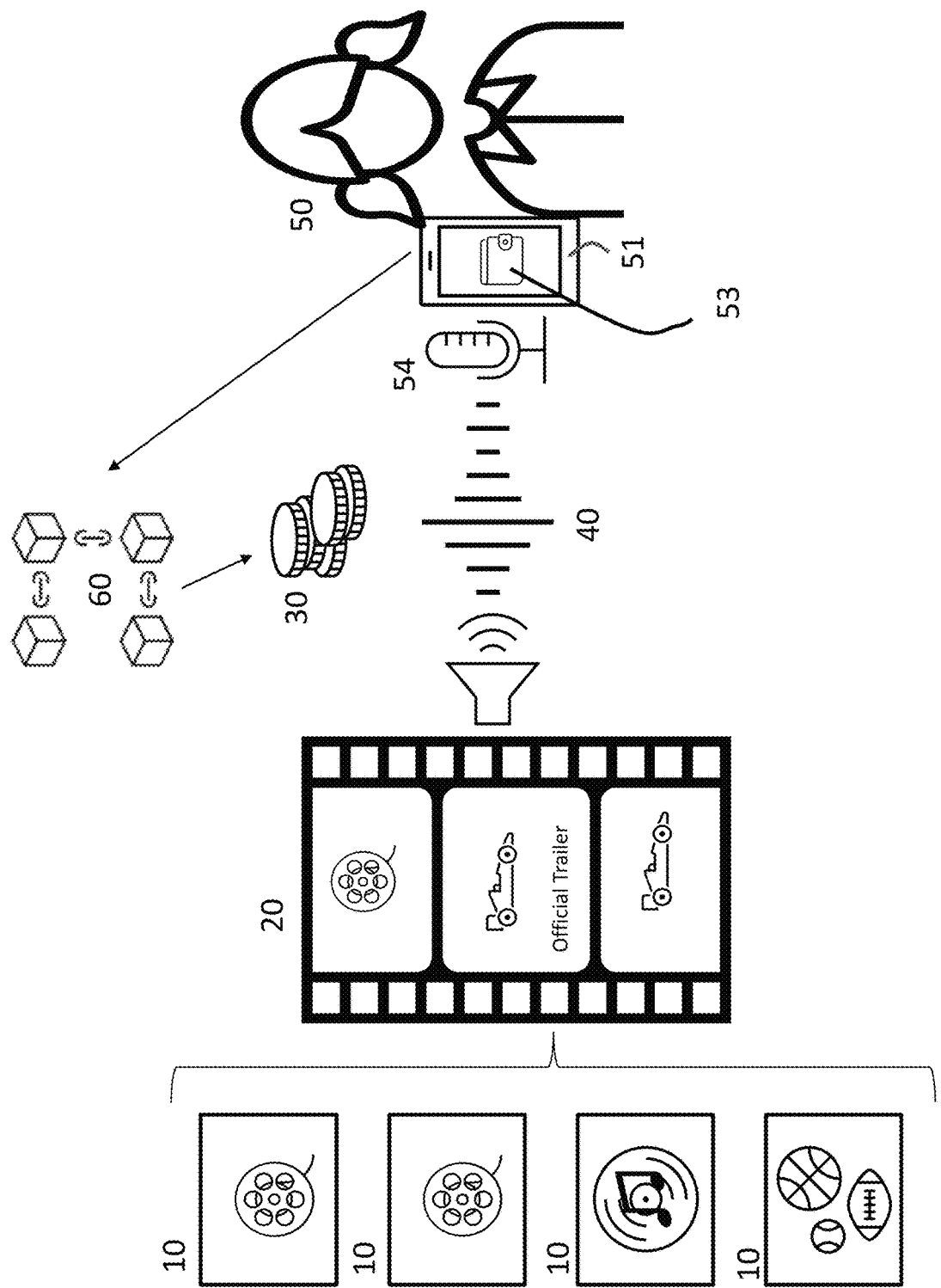
FIG. 1 is a representative diagram for acoustic transmission of value from a sender to a recipient.
Figure 4:
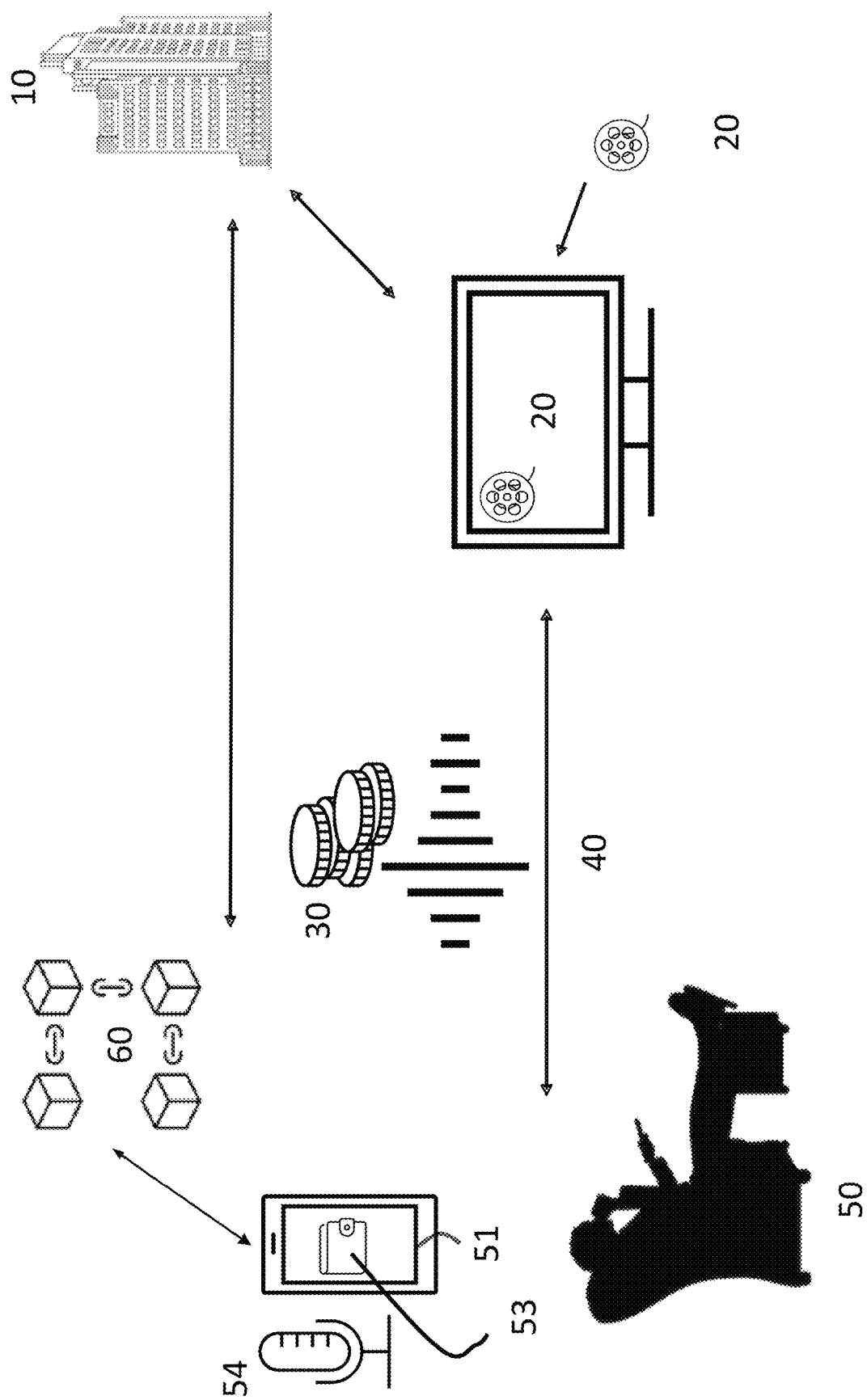
FIG. 4 illustrates an example use case for an in-home implementation of a sonic rewards program from a content provider to an end user.
Figure 11:
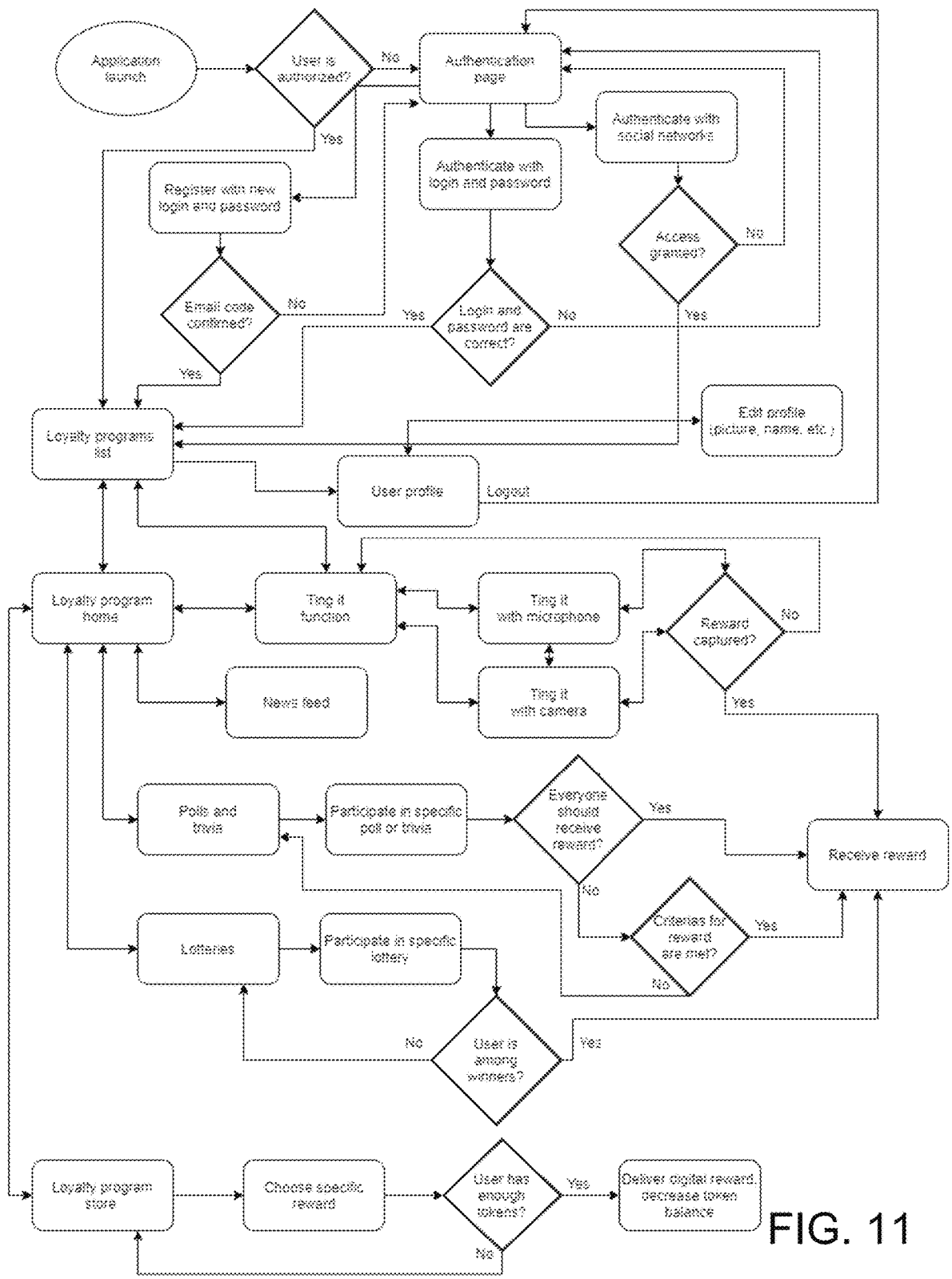
FIG. 11 is a flowchart illustrating an application for an interactive value broadcasting from a sender to a recipient.

According to aspects of the invention, as seen in reference to FIGS. 1 and 11, one or more content providers 10, which may include creators, distributors, advertisers, influencers, and other content and entertainment providers may transfer a digital token 30 via a sound transmission 40, direct to a consumer 50 in a secure, cost efficient and immutable manner. The transfer of the digital token 30 enables generation of a body of verifiable data regarding the consumer 50. The system may also generate a transaction history for the advertiser or business sponsor 10.

For example, a virtual "shooting t-shirt" promotion program may be conducted, where the "virtual t-shirt" is represented by the digital token 30 broadcast over a stadium screen and audio system directly to a consumer's mobile device 51. Likewise, the promotion program may allow participation by the consumer 50 who is watching the game at home on their TV. The digital token 30 may be encoded in a broadcast media content 20 to the user's TV is received by the user's mobile device 51. Decryption of the digital token 30 by the user's digital wallet 53 allows the home consumer 50 to redeem the digital token 30 for a t-shirt, or other item of value.

The claimed invention differs from what currently exists by enabling a direct consumer engagement between a business 10 and the customer 50 thru broadcasting incentives a transmission medium, such as a sound, a Wi-Fi, a Bluetooth, an e-mail, a message, an RFID, or an NFC for transmission of the digital token 30, consumers can be directly rewarded with the digital token 30. In other aspects of the invention, the system allows for simultaneously building new data models to understand customer preferences, habits, and purchasing behaviors.

Through the use of a blockchain ledger 60 and the ability to transfer the digital token 30 via the selected transmission medium, such as an acoustic signal 40, the present invention allows a content provider 10, including an advertiser, an influencer, a content delivery platform, a market researcher, and the like to compensate consumers 50 directly for their loyalty, attention, and other requisite behaviors while tracking verifiable data across a broad rewards ecosystem. In a non-limiting example, consumer 50 watches a movie trailer 20 or advertisement while the encrypted digital token 30 is broadcast on the acoustic signal 40 to a digital wallet 52 in a contactless, immutable, blockchain ledger 60 implementation.

The present invention allows direct consumer engagement from broadcast media providers 10 without the need or limitations of traditional market middlemen. The system adds the ability to track a user engagement for the life of the digital token 30 or reward that is issued. The system provides an exact data attribution for advertisers and content sponsors.

Aspects of the invention greatly expand the potential audience participating in a rewards program, by rewarding fans across a plurality of platforms. For example, fans 50 at an event, such as a football game can be rewarded with a t-shirt token 30 received by a mobile app on their mobile communications device 51. Now fans 50 watching the game at home can also be rewarded and have a chance to participate in catching a virtual reward, such as a t-shirt, a bobble-head, or other promotional giveaway the virtual reward represented as a digital token 30 on their mobile device 51 while directly interacting from their mobile device 51 in any location.

Current systems are costly to the rewards provider 10, inefficient, subject to data breaches, and expensive for the consumer 50. The present invention secures an exchange of an item of value, the digital token 30, in exchange for a consumers' 50 personal data. The exchange is transacted through the immutable block chain 60 based solution in a unique way using sound and other transmission media. The broadcast function also allows a safe and a secure direct interaction in previously inaccessible environments. The resultant efficiencies and enhanced datasets that can be gathered are superior to existing consumer behavior methods.

Core functions of the present invention may also be integrated into many current products surrounding advertising and a focused data gathering to improve over current methods. In some implementations, a target venue 70, such as an airport terminal 70-1, a waiting area 70-2, a shopping mall 70-3 and the like 70-n can receive a media content 20, as shown in reference to FIG. 6. The target venue 70 can further the advertising campaign reaching an intended audience. Likewise, organizers 10 can connect advertisers 10 directly to a target demographic audience 100, 100-1, 100-2, 100-3, 100-n for marketing campaigns.

A survey can be transmitted to or accessed through the user's wallet 53. Once the user has completed the survey, the digital tokens 30 earned for participating in the survey are validated on the blockchain ledger 60 and reflected in the user's wallet 53 on the blockchain ledger 60. In other implementations, live lotteries can take place seamlessly with the distribution of a representation of a lottery ticket, via the digital token 30 that is embedded in secure transmission medium, such as the acoustic signal 40. With validation of the representation of the lottery ticket with the blockchain ledger 60, the results are fully transparent and audit friendly.

Figure 12:
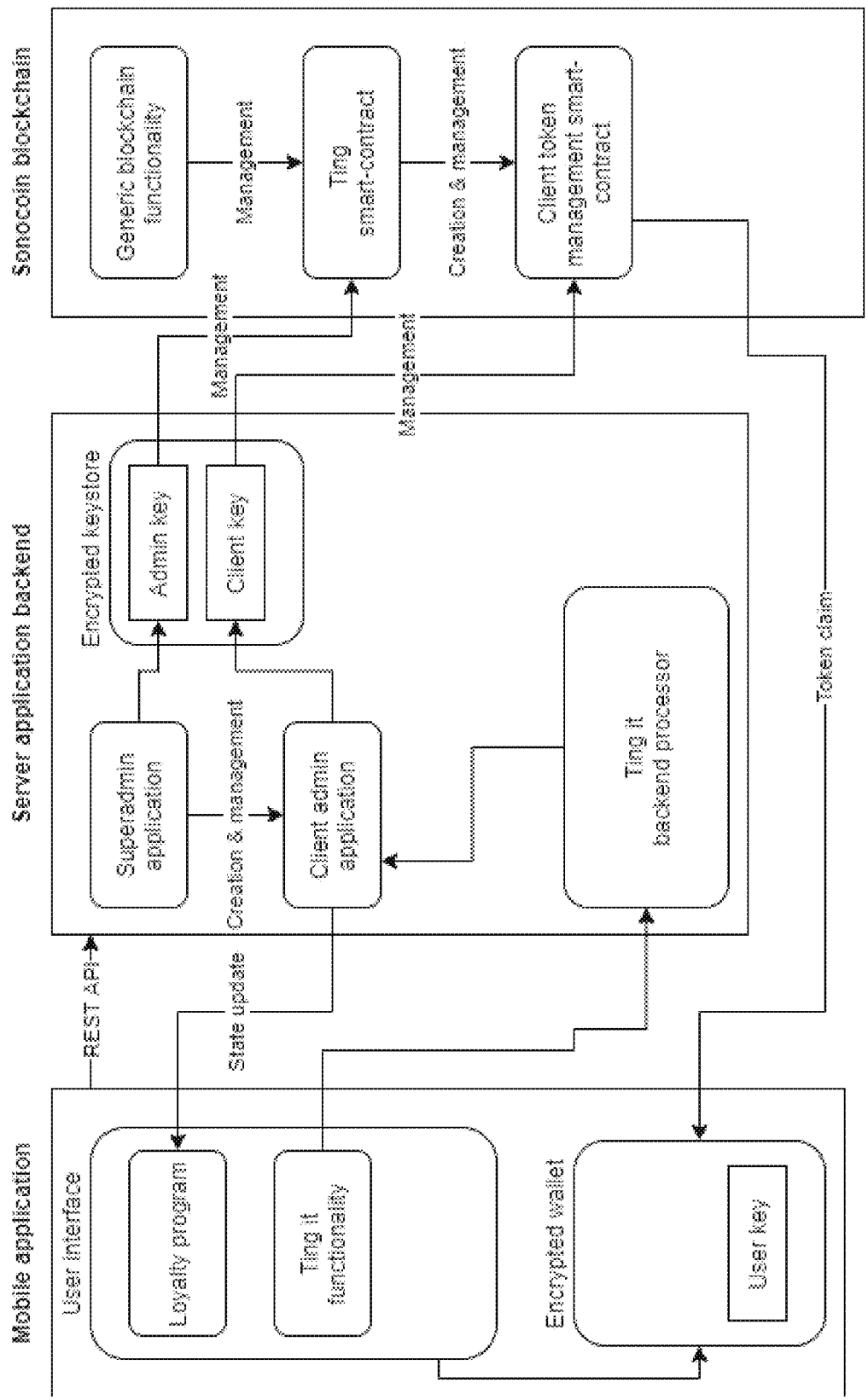
FIG. 12 is a representative architecture for implementing an interactive value broadcasting system.

As seen in reference to FIG. 12, elements of the system may include one or more of the following:

1. User Wallet: When the user 50 installs the application, he/she gains automatic access to the blockchain ledger 60 and a user wallet 53 carried on the blockchain ledger 60. The app, carries a representation of the user wallet 53 on the user's mobile device 51. The representation of the user wallet 53 is configured listen for an activation prompt (in form of an encoded audio/Wi-Fi/Bluetooth/QR/or another signal). The representation of the user wallet 53 is presented in the app while the blockchain ledger 60 retains a ledger of transactions to and from the user's wallet 53

2. Distributed ledger: A blockchain distributed ledger 60 or other distributed ledger provides a back end on which all transactions in the digital token 30 may be settled. Companies 10 may use either an open distributed blockchain ledger 60 or a customized white label blockchain ledger 60 (with associated digital tokens 30). The blockchain ledger 60 provides a consensus mechanism that establishes proof of a stake in the digital token 30. Access to the blockchain ledger 60 is permissioned through one or more role-based access controls. In some instances, all transactions may be committed to the blockchain ledger 60 in an append-only format and validated through a proof of stake consensus mechanism.

3. Data-Over-Sound Receiver: In the case of an audio transmission media, a data-over-sound receiver 54, the "receiver" is responsible for listening to sound frequencies and decoding the sensitive encrypted data from the audio signal 40. Digital tokens 30, naturally residing on the blockchain ledger 60, are encoded and transmitted "off—chain". When received by the receiver 54, and then be decoded by the app, the digital token 30 is validated back onto the blockchain ledger 60 as part of the receiving process. Broadcast digital tokens 30 within the data-over-sound are decoded from the audio signal 40 embedded into content 20, which may be transmitted via any medium with ability to convey sound. Examples of this would include: the broadcast of digital tokens 30 to viewers of advertisements 20 to a User's tablet 51; broadcast of digital tokens 30 from a movie trailer 20 to any audience member 50 with the representation of the user wallet 53 installed on the user's device 51. Alternatively, the broadcast of digital tokens 30 may be conveyed to fans 50 in the seats of an MLB ballgame, with the audio transmission originating from the stadiums sound system.

4. Media Content: One or more media providers 10 provide a media content 20 for embedding the digital token 30 based on the audience needs. The media content 10 may include an audio content, an audio-visual content, a visual content. By way of non-limiting examples, the media content 20 may include a movie, a movie trailer, a song, a news broadcast, a soundtrack.

5. User Reward Collection: Users 50 interact through their device 51 with the above components, to earn and spend digital tokens 30. Users 50 can share their digital tokens 30 with friends or any other account wallet 53 who have the app installed on their mobile device 51. In some instances, reward collection may be a passive activity where the representation of the user's wallet 53 collects digital tokens 30 while the app is open and monitoring the consumer 50 activity. Likewise, the reward collection may be a performance-based activity in which the consumer 50 must perform an activity, such as taking a survey, moving in proximity to a specified location, or other directed performance steps in order to receive the digital token 30 to their digital wallet 53.

6. Vendors or influencers: Vendors or influencers interact directly with consumers 50 through one or more media content 10 to incentivize consumer loyalty and advertising goods/services.

A method according to aspects of the invention may include the following steps:

Step A: User interacts with the Application and creates a Digital Wallet 53, represented in the app and hosted on the blockchain ledger 60.

Step B: Vendors, or content providers 10 fund or otherwise enable the digital tokens 30 to be embedded within a media content 20.

Step C: The digital tokens 30 are then programmed off the blockchain ledger 60 and embedded in a selected media content 20 in accordance with a selected distribution criteria.

When a User 50 watches or consumes the media content 20 while engaging with the app, and the one or more digital tokens 30 are broadcast via the media content 20, the app is configured to detect and receive the digital tokens 30 via the receiver 54. The captured digital tokens 30 are then conveyed to the user's wallet 53 on the blockchain ledger 60, when the user's mobile device 51 is connected to a communications network. In some implementations, if the user 50 downloads a promotion link, then they will "catch" a broadcast digital token 30 at the venue 70, such as the Stadium.

Step D: One or more Loyalty/Advertising campaigns may be run across one or more media content 20 items. Users 50 can earn digital token 30 from media content 20 by participating in a broadcast campaign on any mobile device 51 with a microphone/speaker 54 if their device 51 is configured with the App linked with their digital wallet 53. As will be appreciated, for content 20 streamed to the user's device 51, the "reception" need not include the receiver 54, as the media content 20 may be processed for the embedded digital tokens 30 during a playback of the streaming media content 20 on the user's device 51.

Step E: Users 50 can then navigate through the App to redeem the digital tokens 30 and for goods and services offered by participating Vendors within the ecosystem.

As indicated, the system may include the creation of secure digital wallet 53 on the blockchain ledger 60 and a representation of the digital wallet 53 on the APP. The digital token 30 is native to the blockchain ledger 60. The digital token 30 may be represented cryptographically in any audio file format (i.e. .mp3, .WAV) and embedded within media content 20 files to be broadcasted over various transmission media. When transferred to the user's representation of the digital wallet 53, the digital token 30 is confirmed and validated on the blockchain ledger 60, when the user device 51 is connected to a communications network. Once validated with the blockchain ledger 60, the system completes the transaction with the end consumer 50 by moving the digital token 30 to the consumer's digital wallet 53 on the blockchain ledger 60

Transactions may include any of the following:

Launch>Listening (Success)>Digital tokens Received

Launch>Listening (Fail)>Listening Continues

Launch>Paying with Digital tokens>Transmission>QR Code Generation>Digital Tokens Spent Launch>Paying with Digital tokens 30>Transmission>Audio File Generation>Digital tokens 30 Spent As will be appreciated the digital token 30 may be assigned a value. The value is backed by one or more content provider 10 (vendor, advertisers, platforms, data research) dollars. For example, the value of the digital token 30 may be specified in a campaign budget. A user distribution value (value per user per received broadcast) may be a set value assigned to be received per user, based on the promotion campaign, a call to action, or other distribution mechanism. The digital token 30 value are typically preset and may be coded into the broadcast of the media content 20. The sponsoring entity would be legally liable for redemption values.

The system software and app also contains an administrative and a back end functionality which both allows for the establishment of a broadcast value, in relation to the user and the ecosystem. The system may also facilitate varying levels of data ownership amongst participating partners. The app can separate proprietary data in accordance with a transaction and a selected ecosystem. Application members can opt-in to a shared data governance of overlapping areas of transactional and user movements. One or more reporting functions stem from the back end management of the combined ecosystem datasets, in conjunction with, data from a blockchain explorer.

In other cases, the value can be backed, to some percentage, by a partner value, that is tied to a "good faith" redemption of goods and services. For example—a theater chain could back the value of the digital token 30 with a coupon for one or more of a free movie ticket or a concession item. In another example, a streaming service 10 could back the value of the digital token 30 in exchange for access to additional media content 20". In this regard, any combination of a currency value and a partner value backing desired by the vendor partners. The value of the backing should be sufficient so that consumers 50 perceive as valuable enough to engage with the particular promotional campaign or service.

As seen in reference to FIG. 2, partners can opt into a cross ecosystem participation relationship. Cross ecosystem participation may be opted at varying levels, based on the value placed on the Users 50 (to the partner) in other ecosystems. The application allows Partners running a broadcast campaign to set a secondary value at various levels based on a desired movement of the initial User 50 from one platform 10 to another platform 10.

By way of non-limiting example, values in wallets 53-1 earned in ecosystem "A' might be worth a portion of the value in ecosystem "B". Likewise, this same value in ecosystem "A" may also be worth double if spent in ecosystem "C". Advertising, consumer data managers, and other promotional partners may interface with the app to establish the value, and parameters of the exchange of the value for a selected campaign. The platform converts these values to the attributes of the digital token 30 with respect to different users, participating vendors, and ecosystems. The user 50 may be presented an aggregated wallet 53, reflecting the value of their digital tokens 30 in each of a plurality of content provider 10 wallets, 53-1, 53-2, 53-3 . . . 53-n.

A representative value transaction process according to other aspects of the invention may include:
  (1) Data reflecting a digital token 30 on the blockchain ledger 60 is sent to an encoder;
  (2) Sent data reflecting the digital token 30 is encoded in a media content 10 and is prepared for transmission off the blockchain ledger 60;
  (3) The media content 20 is Broadcast containing the encoded digital token 30;
  (4) Receipt of general broadcast of the media content 20 containing the encoded digital token 30 by one or more users 50 (who each have a digital wallet 53/decoder);
  (5) Reception of Encoded Data by a user device 51;
  (6) Decoder—Decodes data and provides a decoded digital token 30;
  (7) Decoded Data corresponding to the decoded digital token 30 is submitted to the user's digital wallet 53;
  (8) Blockchain Validation—Upon submission of the decoded digital token 30, the decoded digital token 30 is validated as a digital token taken off the blockchain ledger 60 for transmission and is recommitted to the blockchain ledger 60;
  (9) Transaction confirmed upon validation of the decoded digital token 30 on the blockchain ledger 60; and
  (10) User receives the digital token 30 in their digital wallet 53.

Preferably, the value transaction is implemented as an open broadcast to a group (an audience), where only those with the app configured digital wallet 53 and decoder can participate in the value transaction. The transaction begins with the digital token 30 on the blockchain ledger 60. The digital token 30 is transmitted off-chain and leaves the blockchain ledger 60 when it is encoded with the media content 20. off-chain transmission is continued through broadcast of the embedded digital token 30 with the playing or consumption of the media content 20. The digital token 30 is received, decoded and then uploaded back to the blockchain ledger 60 where it is validated and reflected in the user's digital wallet 53 on the blockchain ledger 60.

Committing all value transaction data to the blockchain ledger 60 is an element for the following features:

Data and User integrity—eliminates erroneous (dirty) data. The Application aggregates profile and transaction datasets as they interact across ecosystems, and with different vendor partners. Datasets from disparate systems become tied together in a verifiable format with greater number of attributes, such as shown in reference to FIG. 3.

Trust Creation—the blockchain ledger 60 allows disintermediation of previously needed 3rd parties. In some implementations, the Application allows for vendors to rent "audience access" from participating partners. Value and calls to action can be embedded in the media content 20 that is broadcast to an audience 50, the results of which are then aggregated and provided to the vendor 10 running the promotional campaign.

By way of non-limiting example: a Cola Company 90 wants to conduct market research within a Gaming market. The Cola Company embeds a survey and a promotion within the media content 20 of a participating gaming influencer 10. The participating gaming influencer 10 may rent out "access" through their media content 20 that is provided to their audience 50.

Figure 6:
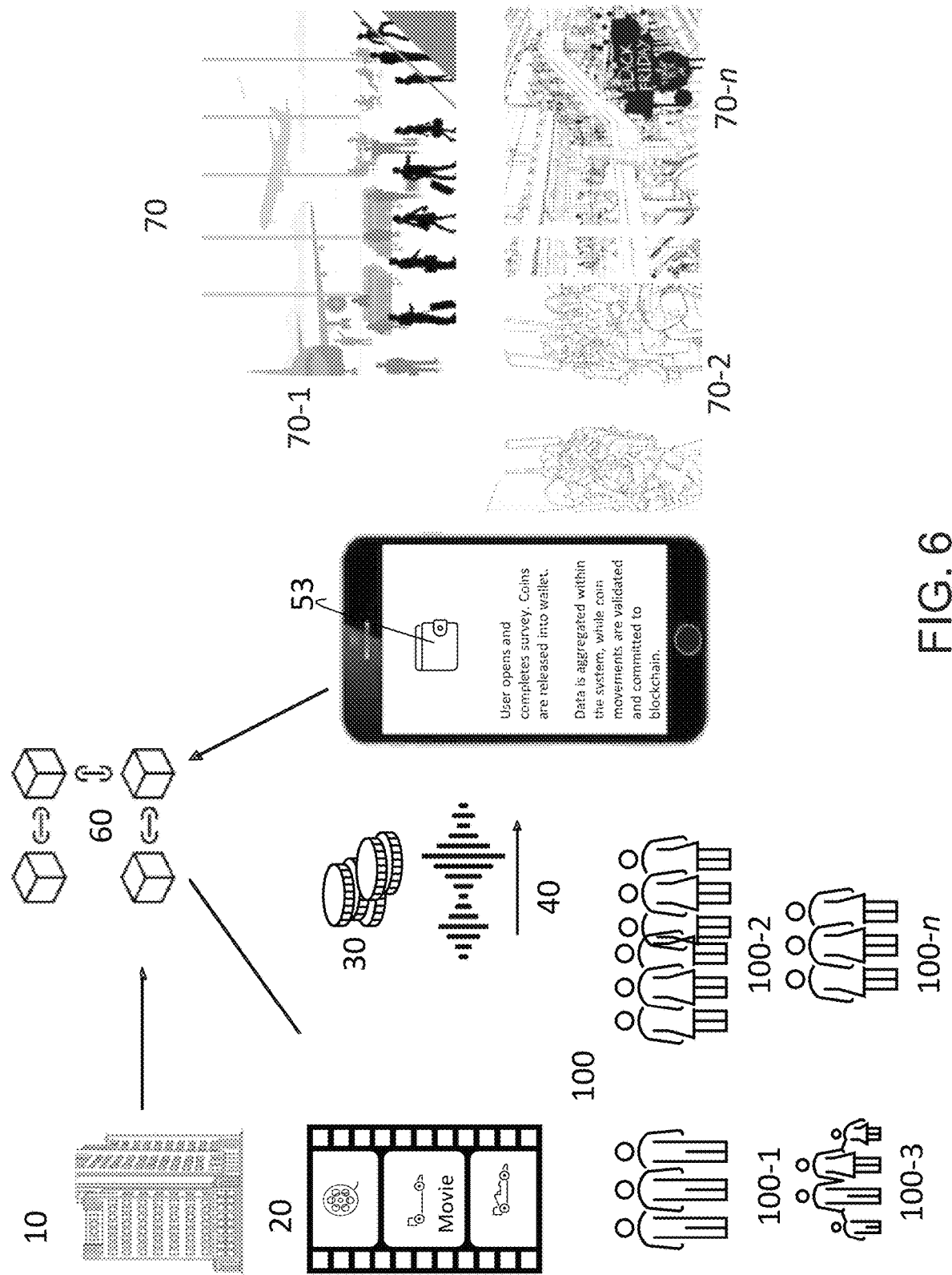
FIG. 6 illustrates an example use case for a demographic aggregated respondents of a sonic survey and rewards program.
Figure 8:
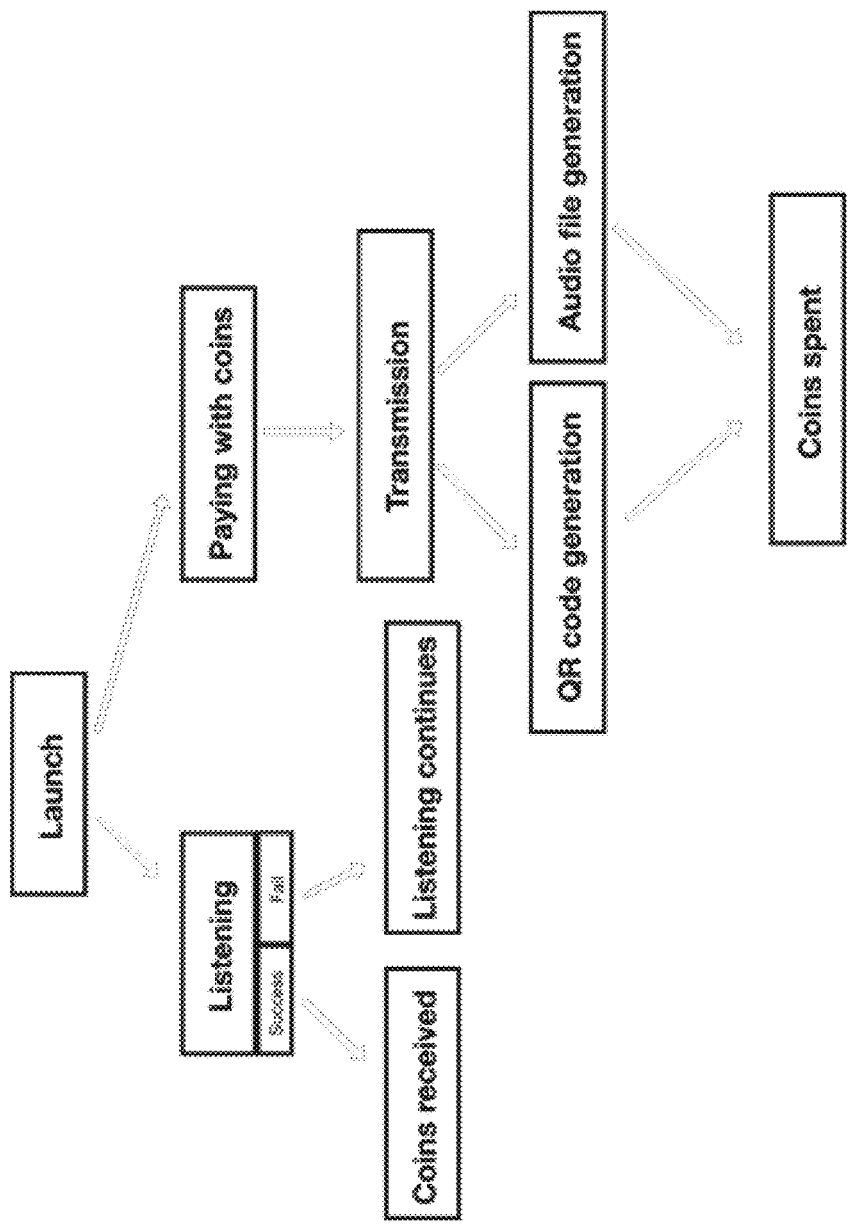
FIG. 8 illustrates a representative flow chart for an Application.
Figure 7:
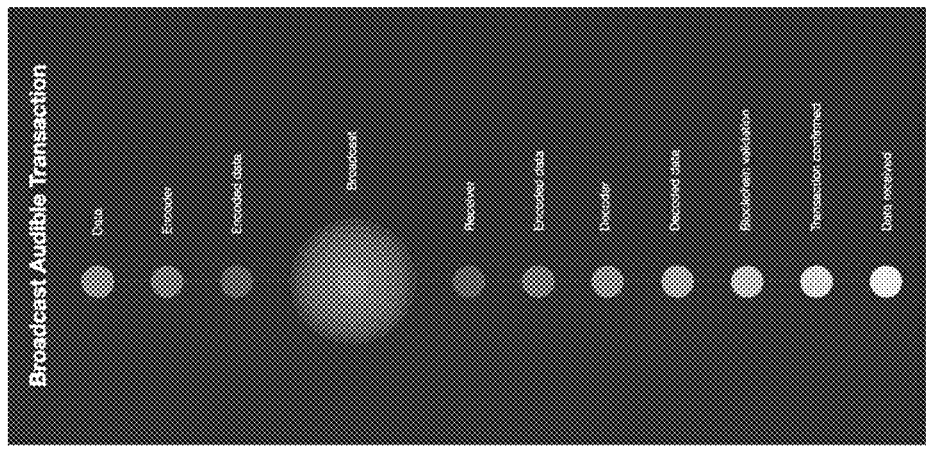
FIG. 7 illustrates a representative flow for a broadcast sonic transaction.

Trust creation allows for implementation of a "piggyback function", such as shown in reference to FIG. 6. In this instance, advertising airtime can be resold by advertisers to one or more partner vendors who wish to reach a targeted demographic 100. In this example. Cola company 10 is broadcasting a commercial 20 in 50 markets during a football game. A local business within each of the 50 markets can rent a piggyback on this airtime, allowing the local business to reach a previously inaccessible market while Cola Company offsets its airtime expense.

In yet other implementations, a movie theater with an upcoming release embeds digital token 30 within one or more trailers 20 to incentivize both a viewing and a sharing of the trailer 20 to increase exposure of the movie release. In this instance, broadcast of a value represented by the digital token 30 is open and will be received by all who have the digital wallet 53 configured on their mobile device 51 and remain proximate to the broadcast area of the movie trailer 20.

In another implementation, a radio show may embed the digital token 30 within one or more commercials 20 to increase a retention and an ability to sell airtime. In this case, the broadcast of the commercial 20 the value is open and will be received by all who have the digital wallet 53 on their mobile device 51 (or other wearable receiver) and remain proximate to the broadcast area, that is their behavior is influenced to remain for the duration of the commercial 20 in order to receive credit for the digital token 30 in their digital wallet 53.

In like manner, surveys for polls can be broadcast via sound wave 40 direct to consumers 50 who are then transferred rewards represented by the digital token 30 upon completion of the survey or the poll. Broadcasts can be sent out in open environments to be received by any active digital wallet 53. Digital token 30 will only be credited to the digital wallet 53 for those recipients who have completed the requisite action of completing the survey or poll.

In yet other examples, a trivia question can be broadcast via sound direct to consumers who can earn digital tokens 30 to their digital wallet based on successfully answering the trivia question. In this case, the trivia broadcasts 20 can be sent out in open environment venues 70 to be received only by those consumers 50 who have completed requisite action of correctly answering the trivia question and remain proximate to the broadcast area.

In yet other implementations, a mode of "Pay for Play" may be employed. In this case a media file 20, such as a *.WAV or other audio file format, may be embedded within a unique file extension that act as a layer of encryption allowing/denying access to the audio file. The media content file 20 will open a default media player on the user's device 51. Each time the media content file 20 is accessed; it will communicate with the blockchain ledger 60 and be recorded as a transaction. When all permitted transactions with the media content file 20 have been spent, the media content file 20 will be no longer accessible or deemed "empty".

Figure 5:
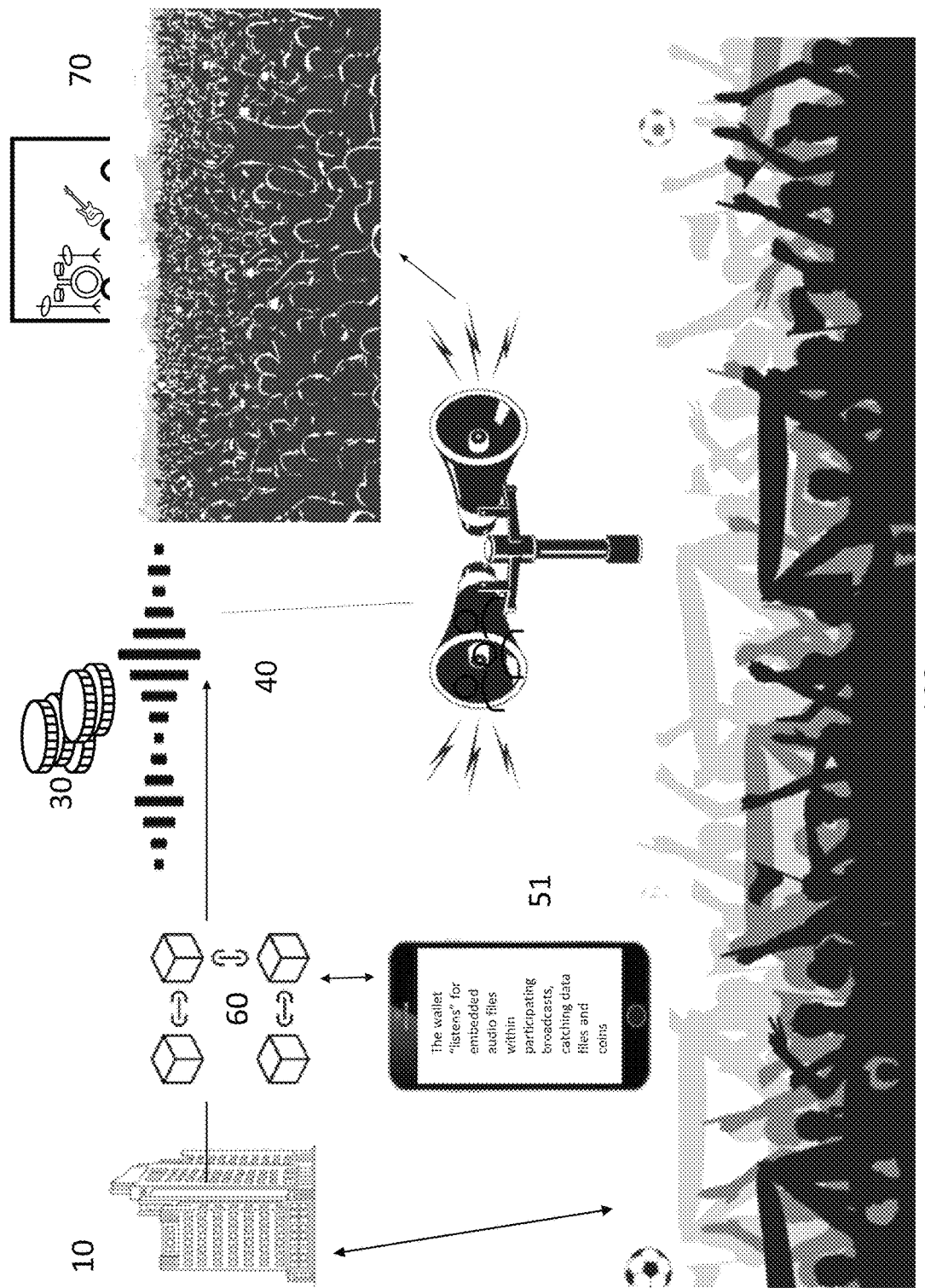
FIG. 5 illustrates an example use case for an event venue implementation of a sonic rewards program.

Example: As seen in FIG. 5, a broadcast promotion for virtually transmitting a t-shirt to fans at the venue 70 is shown. In this broadcast promotion, 50 virtual t-shirts are made available to 50 k fans at the venue 70. The venue 70, such as Yankee Stadium, the digital token 30 is captured on the winning recipient's phone app, then secured on the distributed ledger 60 from the phone app to their digital wallet 53 on the distributed ledger 60. In this case, promotion data is collected for all "digital tokens 30 caught" and all "digital tokens 30 dropped", representing all participants at the event venue 70. If 30 k fans use the app to try to catch the virtual t-shirt token, data for all 30 k participating fans' is available thru the combination of winning tokens (digital tokens 30 caught) and losing tokens (digital tokens 30 dropped).

As will be appreciated from the present disclosure, aspects of the invention can produce products pertaining to broadcasting rewards programs, advertising, embedded airtime functions, data aggregation at movie theaters, live events, radio, television, etc. This includes wearable receivers and audio-visual supplemental components (capable of decoding and validating to the blockchain ledger 60 or completing the off-chain processes or a combination of both). Further, content providers 10 can distribute digital tokens 30 periodically to reward listeners for their presence and/or incorporate lottery ticket events in which one or more people are rewarded in digital tokens 30. The digital tokens 30 collected can be considered as loyalty points for radio stations.

This technology can also be used as a digital media copyright management tool. In this instance, by digitally fingerprinting files using unique sound frequencies. Each file can be individually identified by these unique frequencies embedded within the media content 20. The receiver 54 is used to first authenticate the media content 20 with the blockchain ledger 60 prior. Once authenticated with the blockchain ledger 60, viewing, or playing of the media content 20 is enabled.

The core functions may also be integrated into many current products surrounding advertising and focused data gathering to improve over current methods, such as focused data questionnaires broadcast into targeted demographics which, when completed for rewards, generate rewards.

As previously indicated, sports stadiums, festival organizers, influencers and live event venues 70 can connect advertisers 10 directly to audiences 100 for marketing or promotional campaigns, such as shown in FIG. 6. The digital token 30 can be broadcast generally to all attendees in the audience 100 (engaging in listed functions—or a combination of listed functions). Digital token 30 can also be broadcast generally but received only by those digital wallets 53 completing a previous "call to action" (such as providing data or completing a bounty).

Digital token 30 can also be broadcast to digital wallet holders as they pass through certain areas or locations within an event venue 70. This passage may be used to drive traffic and allow for other promotional and advertising applications. For example, at an Auto Show, the digital wallet holder can get "X" amount of digital token 30 from each sponsored area (example Ferrari Digital tokens 30/Mercedes Digital tokens 30/Audi Digital tokens 30/Chevy Digital tokens 30/Kia Digital tokens 30), increasing overall movement of consumer 50 to all participating areas of the event venue 70.

In some implementations, a social media site 10 may be a reward source for a loyalty program or a rewards campaign. In this instance the transmission medium may be one of an audio format, a URL link, or a QR code. The user device 51 decodes the reward 30. Based on the reward configuration, the application can ask the consumer 50 for additional information from the consumer 50 (profile details, activity statistic, interests, and the like) The backend server 90 is configured to determine whether the user 50 has provided the requested information. If the backend server 90 determines that the conditions have been met, the backend server 90 transacts the reward 30 to the user's digital wallet 53 on the blockchain ledger 60.

Figure 10:
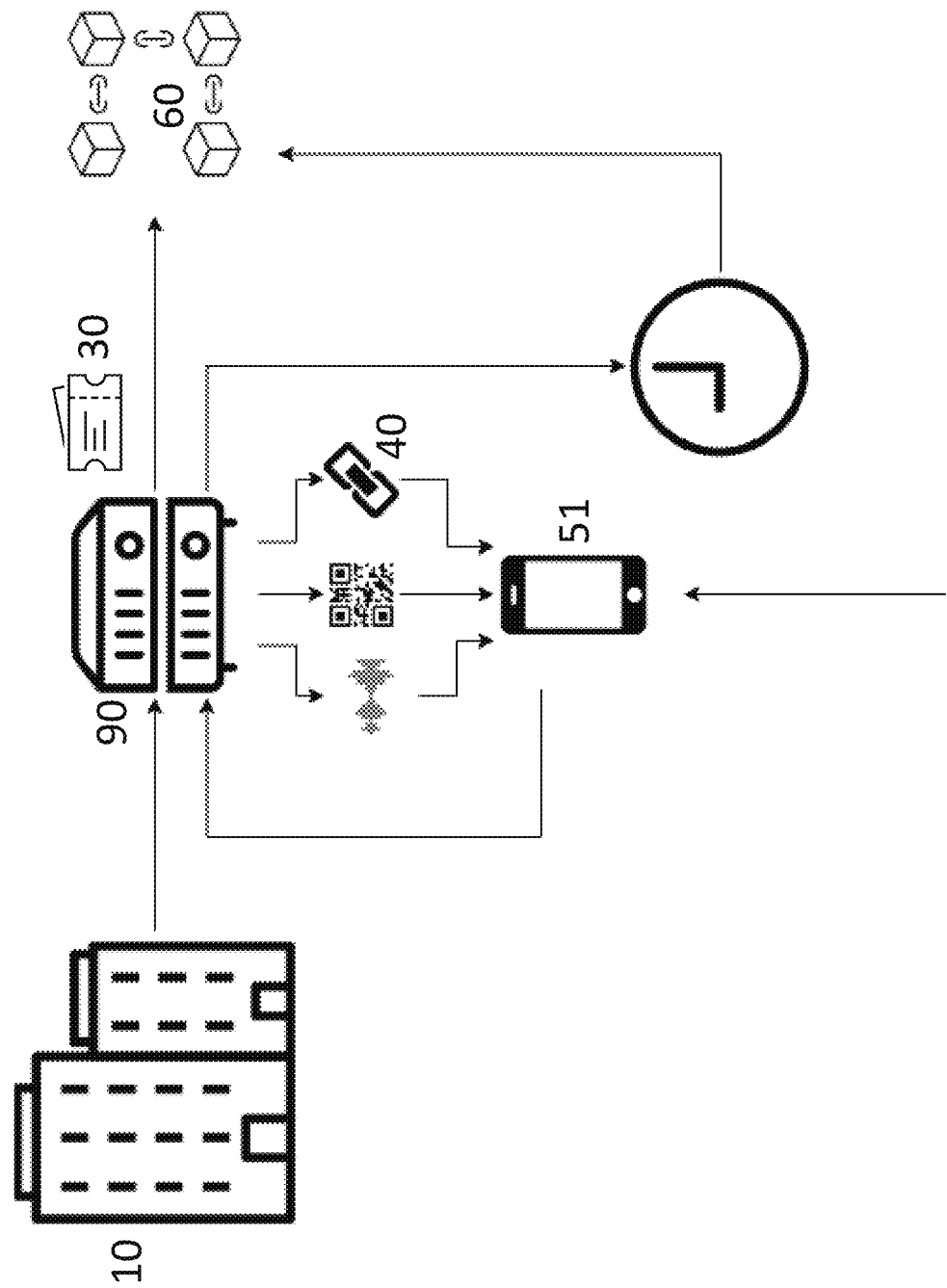
FIG. 10 illustrates an implementation for the transaction of a virtual lottery ticket.

In other applications, live virtual lotteries, such as shown in FIG. 10 can also take place seamlessly with the distribution of a plurality of virtual raffle tickets. To use the system as a lottery platform, data from all participants 50 (as opposed to just winning participants) are recognized. Broadcast lottery with one or more winning entries and secure data from all fans participating using the "tokens caught" and "tokens dropped" distribution. A backend server 90 generates the virtual raffle tickets 30 as a smart contract carried on the blockchain ledger 60. The virtual raffle ticket 30 is embedded in the transmission medium and media content 20. After capture of the virtual lottery ticket 30, the user becomes a participant in the virtual lottery. Distribution of the plurality of virtual raffle tickets can be set to take place at predetermined temporal interval. Once the time trigger occurs, the smart contract randomly selects a winner and issues a reward directly to the user's digital wallet 53. In some instances, the distribution of the plurality of virtual raffle tickets 30 may also be configured to provide more entries for more loyal customers. The live virtual lotteries can increase average time customers engage with the facility or the event.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method of transacting a value of a digital token on a blockchain ledger comprising:
encoding the digital token carried on the blockchain ledger as an encoded digital token;
embedding the encoded digital token in a media content;
transmitting the encoded digital token in an off-ledger condition during a playback of the media content; and
receiving the media content containing the encoded digital token by a representation of a digital wallet operating on a mobile computing device;
decoding the encoded digital token by the representation of the digital wallet as a decoded digital token;
submitting the decoded digital token to the blockchain ledger via a communication network;
validating the decoded digital token against the digital token on the blockchain ledger; and
when validated, reflecting the digital token in a digital wallet on the blockchain ledger, the digital wallet corresponding to the representation of the digital wallet on the mobile computing device.

2. The method of claim 1, further comprising:
embedding a survey in the media content;
receiving the media content by the representation of the digital wallet; and
submitting the decoded digital token to the blockchain ledger upon completion of the survey.

3. The method of claim 1, further comprising:
submitting information from the mobile computing device in exchange for the digital token.

4. The method of claim 1, further comprising:
targeting the media content to a targeted demographic group.

5. A non-transitory computer-readable memory adapted for use by a content distribution service provider to distribute digital token, the non-transitory computer-readable memory used to direct a computer of the content distribution service provider to perform the steps of:
encoding a digital token carried on a blockchain ledger as an encoded digital token;
embedding the encoded digital token in a media content;
transmitting the encoded digital token in an off-ledger condition during a playback of the media content; and
receiving the media content containing the encoded digital token by a representation of a digital wallet operating on a mobile computing device;
decoding the encoded digital token by the representation of the digital wallet as a decoded digital token;
validating the decoded digital token against the digital token on the blockchain ledger; and
when validated, reflecting the digital token in a digital wallet on the blockchain ledger, the digital wallet corresponding to the representation of the digital wallet on the mobile computing device.

6. The non-transitory computer-readable memory of claim 5, further comprising:
submitting the decoded digital token to the blockchain ledger via a communication network.

7. The non-transitory computer-readable memory of claim 5, further comprising:
embedding a survey in the media content;
receiving the media content by the representation of the digital wallet; and
submitting the decoded digital token to the blockchain ledger upon completion of the survey.

8. The non-transitory computer-readable memory of claim 5, further comprising:
submitting information from the mobile computing device in exchange for the digital token.

9. The non-transitory computer-readable memory of claim 5, further comprising:

targeting the media content to a targeted demographic group.

\* \* \* \* \*